United States Patent
Larsson et al.

[11] Patent Number: 6,011,808
[45] Date of Patent: Jan. 4, 2000

[54] REDUNDANT CODES FOR CLOCK RECOVERY IN SERIAL LINKS

[75] Inventors: Patrik Larsson, Matawan; Per Magnusson, Hazlet, both of N.J.

[73] Assignee: Lucent Technologies Inc., Murray Hill, N.J.

[21] Appl. No.: 08/787,835

[22] Filed: Jan. 23, 1997

[51] Int. Cl.⁷ .................................................. H04J 3/06
[52] U.S. Cl. ........................ 370/510; 370/511; 375/371
[58] Field of Search ................................ 375/316, 259, 375/355, 375, 373, 360, 371, 357; 370/503, 509, 516, 510, 517

[56] References Cited

U.S. PATENT DOCUMENTS

| | | | |
|---|---|---|---|
| 5,077,758 | 12/1991 | DeLuca et al. | 375/95 |
| 5,371,737 | 12/1994 | Nelson et al. | 370/84 |
| 5,553,103 | 9/1996 | Julyan et al. | 375/350 |
| 5,594,763 | 1/1997 | Nimishakavi | 375/376 |
| 5,600,682 | 2/1997 | Lee | 375/354 |
| 5,629,955 | 5/1997 | McDonough | 375/200 |
| 5,642,386 | 6/1997 | Rocco, Jr. | 375/355 |
| 5,675,584 | 10/1997 | Jeong | 375/220 |

*Primary Examiner*—Chi H. Pham
*Assistant Examiner*—Emanuel Bayard
*Attorney, Agent, or Firm*—Eugene J. Rosenthal

[57] ABSTRACT

The amount of jitter that results in a serial receiver having a parallel architecture Can is reduced by insuring that the edges specifically introduced by the code are actually received by the phase detector. In particular, the code is designed to increase the probability that the edges it introduces are actually received by the phase detector. In a preferred embodiment of the invention, all the edges introduced by the code are actually received by the phase detector. This is achieved by guaranteeing that the edges introduced by the code are evenly spaced in the data stream at a rate corresponding to the phase detector sampling rate. For example, if the receiver consists of N data samplers, e.g., N=5, and one phase detector, the edges introduced by the code are arranged to be N symbols apart. This may be done by inserting as the Nth symbol an overall symbol that has a dummy component so that an edge results between the N−1 symbol and the overall Nth symbol. Thus, the data stream is arranged into repeating frames of N symbols. Alternatively, the frame could be arranged to be a multiple X of N, e.g., the frame is K symbols long, K=XN, with the partially redundant data symbol being the K−1, i.e., XN−1, symbol.

14 Claims, 2 Drawing Sheets

REDUNDANT CODES FOR CLOCK RECOVERY IN SERIAL LINKS

TECHNICAL FIELD

This invention relates to the codes employed in high-speed serial bit streams for clock recovery.

BACKGROUND OF THE INVENTION

A well known problem in the art of serial communication is the need to regenerate from a data stream the clock that was used in generating a data stream. In particular, a parallel architecture is often employed for the data receiver when the data stream is at a very high bit rate. Typically, such a xceiver is made up of several parallel data samplers, and each of the data samplers only looks at a portion of the entire data stream, such portion being at a lower bit rate than that of the overall data stream. Nevertheless, to detect the data, each of the parallel data samplers must look in the center of a bit time of a high speed bit. This center time is determined by the recovered clock.

To detect the clock, conventionally, an additional sampler is used as a phase detector and it samples the incoming data stream at a point in between two bits, at which time an edge may occur. Such a sampler only looks at the data stream at the same rate as the data samplers, and thus it sees the occurrence of edges less frequently than if it were looking at the overall data stream. However, since conventional codes distribute edges throughout the overall data stream, enough edges are available for use by the phase detector sampler so that it can detect the clock.

Unfortunately, because there is no regular placement of the edges, the receiver cannot make use of all the edges which were introduced by the code for clock recovery purposes. As a result, the amount of jitter is increased over that generated by a standard, non-parallel architecture receiver. This often results in an undesirable higher bit error rate.

The same problem also occurs when multilevel symbols are used in the data stream instead of bits, e.g., when using pulse amplitude modulated symbols.

SUMMARY OF THE INVENTION

The amount of jitter that results in a serial receiver having a parallel architecture can be reduced, in accordance with the principles of the invention, by insuring that the edges specifically introduced by the code are actually received by the phase detector. In particular, the code is designed to increase the probability that the edges it introduces are actually received by the phase detector. In a preferred embodiment of the invention, all the edges introduced by the code are actually received by the phase detector. This is achieved by guaranteeing that the edges introduced by the code are evenly spaced in the data stream at a rate corresponding to the phase detector sampling rate.

For example, if the receiver consists of N data samplers, e.g., N=5, and one phase detector, the edges introduced by the code are arranged to be N symbols apart. This may be done by inserting as the Nth symbol an overall symbol that has a dummy component so that an edge results between the N−1 symbol and the overall Nth symbol. Thus, the data stream is arranged into repeating frames of N symbols. Alternatively, the frame could be arranged to be a multiple X of N, e.g., the frame is K symbols long, K=XN, with the partially redundant data symbol being the K−1, i.e., XN−1, symbol.

More than one phase detector may be used, to further reduce jitter, but the number of phase detectors used should be less than the number of data samplers.

DETAILED DESCRIPTION

Figure 1:
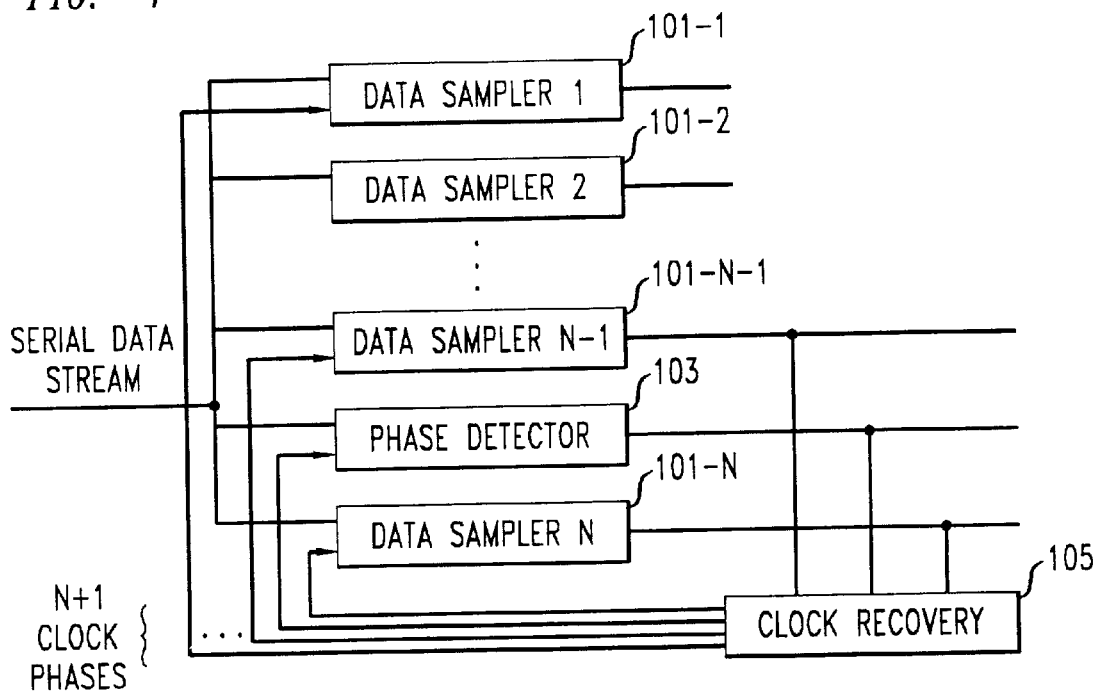
FIG. 1 shows an exemplary serial receiver having a parallel architecture.

In order to understand the invention, it is best to first describe the operation of a serial receiver having a parallel architecture that makes use of the invention. Therefore, FIG. 1 shows an exemplary serial receiver having a parallel architecture which includes data samplers 101, including data samplers 101-1 through 101-N, phase detector 103, and clock recovery unit 105. Each of data samplers 101 is provided with the overall serial data stream at a rate R, as is phase detector 103. Each of data samplers 101 and phase detector 103 operates to sample the overall serial data stream at a rate of R/N. The individual times at which each data sampler 101 and phase detector 103 samples is controlled by clock recovery unit 105. Clock recovery unit 105 receives the outputs of data samplers N and N−1, as well as phase detector 103, and is arranged to generate the clocks which determine when sampling occurs.

Clock recovery unit 105 generates the clocks as a function of the timing of an edge occurring between data samplers N and N−1, in accordance with an aspect of the invention. In particular, if the edge occurs later than expected, clock recovery unit 105 either speeds up, or moves forward, depending on implementation, the generated clocks. Likewise, if the edge occurs earlier than expected, clock recovery unit 105 either slows down, or moves backward, depending on implementation, the generated clocks. The particular implementation may employ a phase locked loop (PLL) or a delay locked loop (DLL), at the discretion of the implementor. For purposes of further discussion, it is assumed that a PLL is employed.

In accordance with an aspect of the invention, a transition is guaranteed to occur between symbols N and N−1, where symbol N is at least a partially redundant symbol. Symbols N and N−1 are supplied by data sampler 101-N and data sampler 101-N−1, respectively, to clock recovery unit 105. Accordingly, clock recovery unit 105 checks to determine if symbols 101-N and N−1 are different. If symbols N and N−1 are different, the output of phase detector 103 is tested. If the output of phase detector 103 is the same as that of symbol N−1, this indicates that sampling occurred too early. Accordingly, the frequency of the recovered clock is slowed down. If the output of phase detector 103 is different from that of symbol N−1, this indicates that sampling occurred too late. Accordingly, the frequency of the recovered clock is speeded up. If symbols N and N−1 are identical, the clock is not adjusted, although other processing, e.g., error processing, might be invoked.

Figure 2:
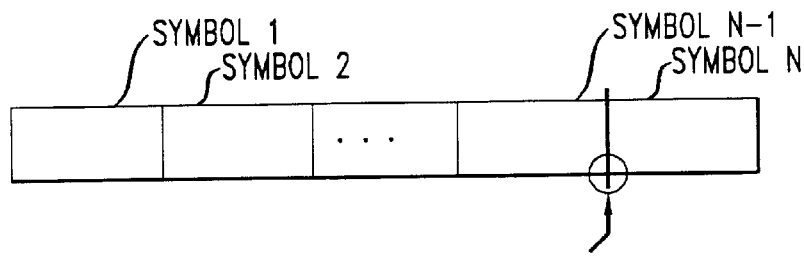
FIG. 2 shows a frame of an exemplary data stream.
Figure 3:
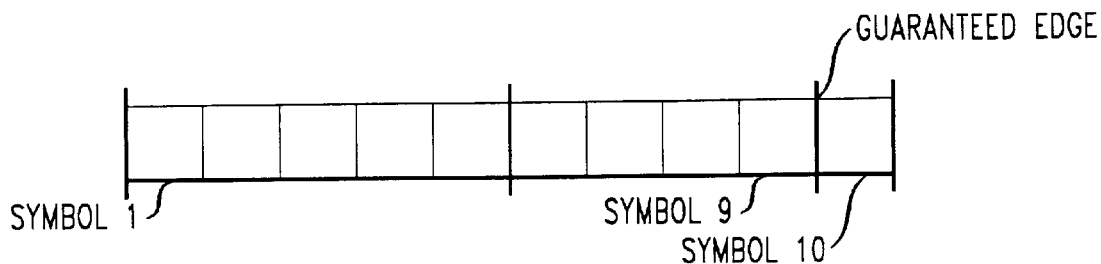
FIG. 3 shows a frame of another exemplary data stream.

The foregoing assumed that the phase detector output is either the same as symbol N or N−1. This limitation is not required, as the phase of the clock may be exact, or close enough to exact, so as to generate a third value which so indicates. If such a result is obtained, the clock is not adjusted. Thus, generally, the amount of speeding up or slowing down of the clock could be made a function of the difference between the phase detector output and the data symbols N and N−1. FIG. 2 shows a frame of an exemplary data stream where N=5. For this data stream X=1 and K=5. The data is coded to insure a transition between symbols 4 and 5, e.g., symbols 4 and 5 will not be identical. Similarly, FIG. 3 shows a frame of another exemplary data stream where N=5. However, for this data stream X=2 and so K=10. The data is coded to insure a transition between symbols 9 and 10, e.g., symbols 9 and 10 will not be identical.

Figure 4:
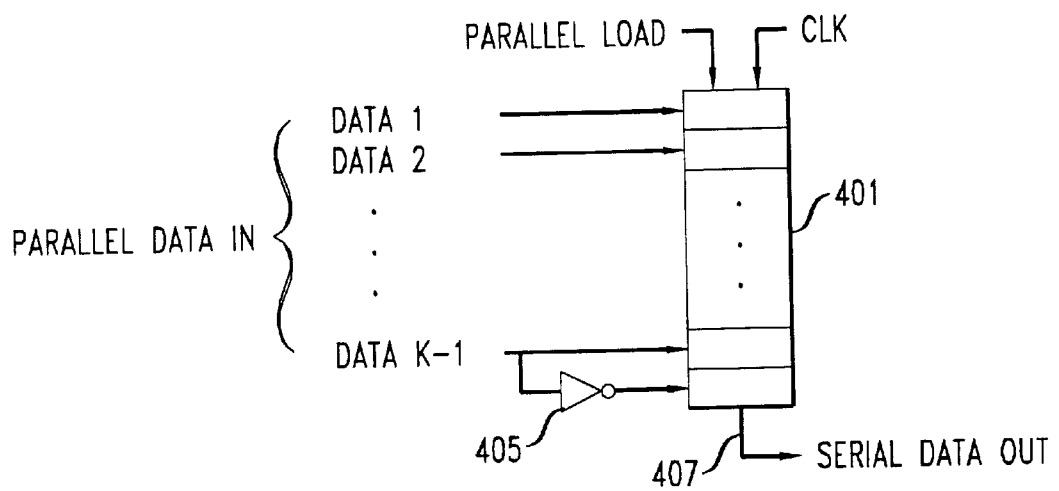
FIG. 4 shows an exemplary circuit for use by a transmitter to develop a binary data stream in accordance with the principles of the invention.

FIG. 4 shows an exemplary circuit for use by a transmitter to develop a binary data stream in accordance with the principles of the invention. Shown in FIG. 4 are parallel load shift register 401 and inverter 405. Data symbols 1 to K−1, each being one bit, are presented in parallel to shift register 401. The partially redundant symbol K, which in this case of binary data is completely redundant, is generated by inverter 405, in accordance with an aspect of the invention. In particular, by using the inverse of data symbols K−1 as data symbol K, it is guaranteed that there is an edge between symbols K−1 and K, in accordance with an aspect of the invention. Control signal PARALLEL LOAD is used to lock the parallel data into shift register 401. Clock signal CLK is then used to shift the data out of shift register 401 one bit at a time onto serial data out line 407. It is signal CLK that must effectively be recovered in the receiver.

Figure 5:
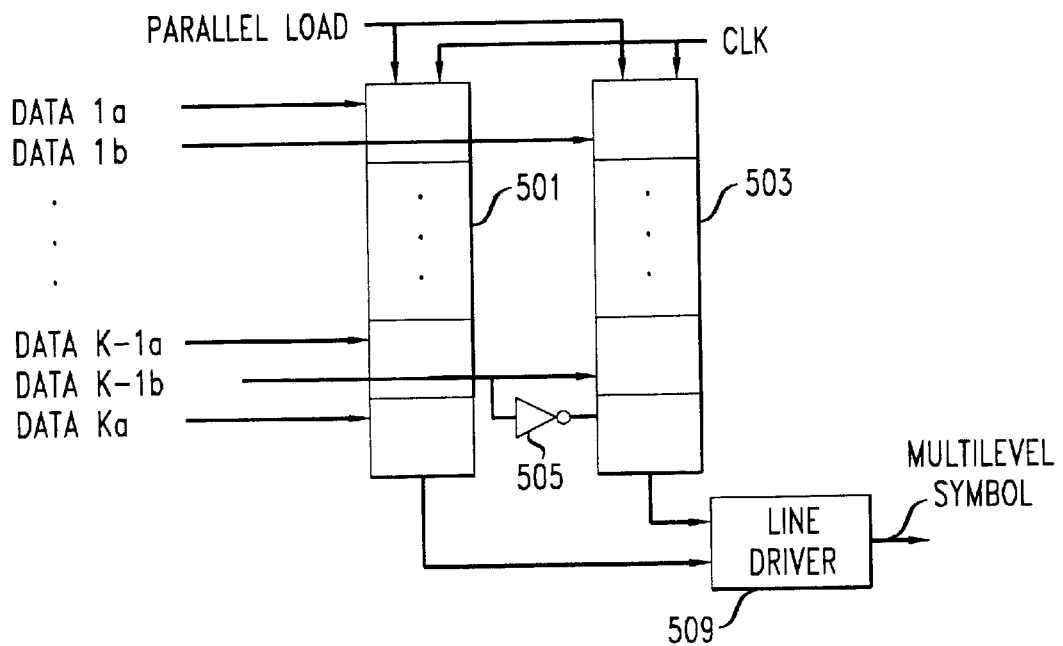
FIG. 5 shows an exemplary circuit for use by a transmitter to develop a data stream when multibit symbols are used, in accordance with the principles of the invention.

FIG. 5 shows an exemplary circuit for use by a transmitter to develop a data stream when multibit symbols are used, in accordance with the principles of the invention. For the example of FIG. 5, two bits per symbol are shown. However, those of ordinary skill in the art will be able to extend the example to more than two bits per symbol. Shown in FIG. 5 are parallel load shift registers 501 and 503, inverter 505, and line driver 509. One bit, e.g., the low order bit, of each of data symbols 1 to K−1 is presented in parallel to shift register 501. Likewise, the other bit, e.g., the high order bit, of each of data symbols 1 to K−1 is presented in parallel to shift register 503. The partially redundant symbol K is generated by inverter 503 inverting the high order bit of symbol K−1 and combining it with bit data Ka, in accordance with an aspect of the invention. It is thus guaranteed that symbols K and K−1 will not be the same, and so will have an edge between them. The low order bit of partially redundant symbol K is supplied to shift register 501 while the high order bit is supplied to shift register 503.

Control signal PARALLEL LOAD is used to clock the parallel data into shift registers 501 and 503. Clock signal CLK is then used to control the synchronized shifting of data out of shift registers 501 and 503, one bit per shift register at each clock tick. It is signal CLK that must be effectively recovered in the receiver. The bits shifted out from shift registers 501 and 503 are supplied to line driver 509, which generates a multilevel symbol therefrom. The multilevel symbol is transmitted to the receiver.

It will be recognized that software may be employed to implement the invention.

The foregoing merely illustrates the principles of the invention. It will thus be appreciated that those skilled in the art will be able to devise various arrangements which, although not explicitly described or shown herein, embody the principles of the invention and are included within its spirit and scope.

What is claimed is:

1. An electronically embodied data communications signal for use in serial communications, comprising:
   a repeating electronic frame including a plurality of locations for symbols being communicated, said electronic frame representing at least one data symbol and at least one partially redundant symbol located at a fixed one of said plurality of locations in said frame;
   wherein said at least one partially redundant symbol has a value that guarantees the occurrence of an edge at a predetermined one of said plurality of locations in said frame.

2. The invention as defined in claim 1 wherein said predetermined location is prior to said fixed location.

3. The invention as defined in claim 1 wherein said predetermined location is after to said fixed location.

4. An electronically embodied data communications signal for use in serial communications, said signal carrying data to be received by a receiver including N data samplers and a phase detector, the signal comprising:
   a repeating electronic frame including K symbols, K being a multiple of N, at least one of said symbols being a partially redundant symbol located at a fixed location in said frame;
   wherein said at least one partially redundant symbol results in occurrence of an edge between the K−1 symbol and the overall Kth symbol.

5. The invention as defined in claim 4 wherein said symbols are binary symbols and said partially redundant symbol is generated by inverting the K−1 symbol.

6. The invention as defined in claim 4 wherein said symbols are pulse amplitude modulated symbols and said partially redundant symbol is generated by selecting a level different from the K−1 symbol.

7. The invention as defined in claim 4 wherein said symbols are pulse amplitude modulated symbols and said partially redundant symbol is generated by selecting a level different from the K−1 symbol so that the resulting transition passes through the average of all possible levels.

8. The invention as defined in claim 4 wherein said symbols are pulse amplitude modulated symbols and said partially redundant symbol is completely redundant and contains no data.

9. The invention as defined in claim 4 wherein said symbols are pulse amplitude modulated symbols and said partially redundant symbol is generated by selecting a level that is the same magnitude and opposite in sign from the K−1 symbol with respect to the average of all possible levels.

10. The invention as defined in claim 4 wherein said partially redundant symbol regularly appears within said repeating electronic frame at a rate corresponding to a sampling rate of said phase detector.

11. A method for generating an electronically embodied data communications signal for use in serial communications, comprising the steps of:
   generating a repeating electronic frame including a plurality of locations for symbols being communicated, said electronic frame representing at least one data symbol and at least one partially redundant symbol located at a fixed one of said plurality of locations in said frame; and
   setting said at least one partially redundant symbol to a value that guarantees the occurrence of an edge at a predetermined one of said plurality of locations in said frame for each instantiation of said repeating electronic frame.

12. Apparatus for generating an electronically embodied data communications signal for use in serial communications, said signal carrying data in a repeating electronic frame to be received by a receiver including N data samplers and a phase detector, said apparatus comprising:

a shift register for generating a repeating electronic frame including K symbols, K being a multiple of N, at least one of said symbols being a partially redundant symbol located at a fixed location in said frame so that there is an edge between the K−1 symbol and the overall Kth symbol; and an inverter for developing said partially redundant symbol from another symbol of said K symbols.

13. Apparatus for generating an electronically embodied data communications signal for use in serial communications, said signal carrying data in a repeating electronic frame to be received by a receiver including N data samplers and a phase detector, said apparatus comprising:

means for generating an instantiation of said repeating electronic frame including K symbols, K being a multiple of N, at least one of said symbols being a partially redundant symbol located at a fixed location in said frame;

wherein said means for generating further includes means for assigning a value to said at least one partially redundant symbol so as to result in the occurrence of an edge between the K−1 symbol and the overall Kth symbol; and means for storing said value in said instantiation of repeating electronic frame.

14. The invention as defined in claim 13 wherein means for generating includes said partially redundant symbol in said instantiation of said repeating electronic frame so that within said repeating electronic frame partially redundant symbols appear at a rate corresponding to a sampling rate of said phase detector.

* * * * *